United States Patent [19]

Miyazaki et al.

[11] Patent Number: 5,110,520
[45] Date of Patent: May 5, 1992

[54] METHOD FOR MANUFACTURING A POROUS STATIC PRESSURE GAS BEARING

[75] Inventors: Takatomi Miyazaki, Tsuchiura; Satoshi Ohsaki, Ushiku, both of Japan

[73] Assignee: Canon Kabushiki Kaisha, Tokyo, Japan

[21] Appl. No.: 594,933

[22] Filed: Oct. 10, 1990

[30] Foreign Application Priority Data

Oct. 13, 1989 [JP] Japan .................. 1-265221
Mar. 9, 1990 [JP] Japan .................. 2-056676
Apr. 19, 1990 [JP] Japan .................. 2-101713
Apr. 19, 1990 [JP] Japan .................. 2-101714

[51] Int. Cl.⁵ .......................... B29C 67/00; B05D 5/00
[52] U.S. Cl. ................................ 264/40.3; 264/40.1; 264/134; 264/344; 264/504; 427/244; 427/245; 427/271; 427/272; 427/336

[58] Field of Search ............. 264/40.1, 40.3, 134, 264/343, 344, 500, 504, 510, 512, 341; 427/244, 245, 246, 271, 272, 273, 336

[56] References Cited

U.S. PATENT DOCUMENTS

3,721,479 3/1973 Rasnick et al. .............. 384/109
4,518,678 5/1985 Allen ............................ 427/273
4,954,192 9/1990 Dziekan ....................... 427/273

*Primary Examiner*—Jan H. Silbaugh
*Assistant Examiner*—Brian J. Eastley
*Attorney, Agent, or Firm*—Fitzpatrick, Cella, Harper & Scinto

[57] ABSTRACT

A method of manufacturing a porous static pressure gas bearing includes the steps of impregnating a porous material to be adjusted in injection flow rate with resin and closing vent openings, and applying a solvent for dissolving the resin to the porous material through a pattern having a predetermined opening distribution.

22 Claims, 15 Drawing Sheets

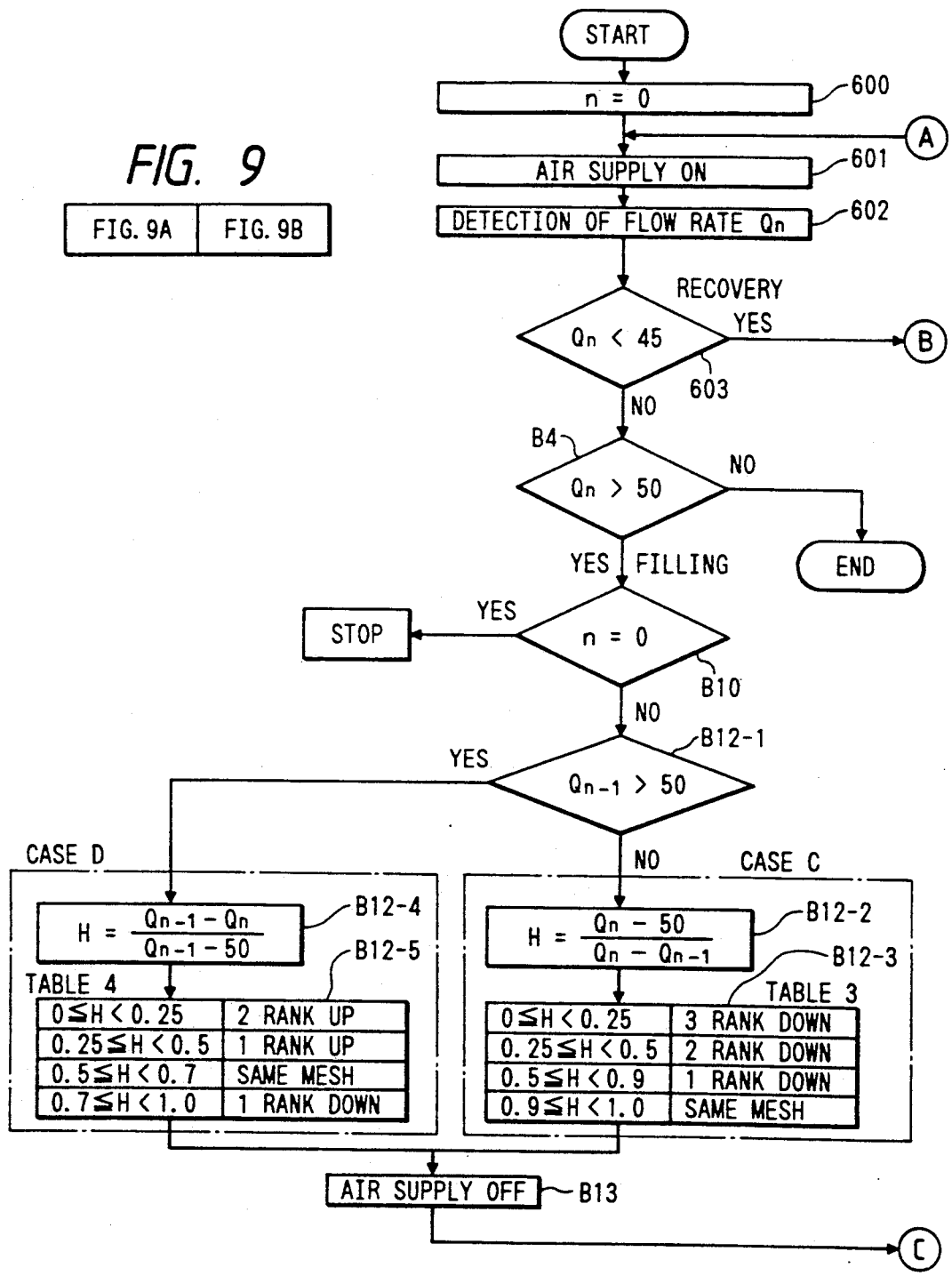

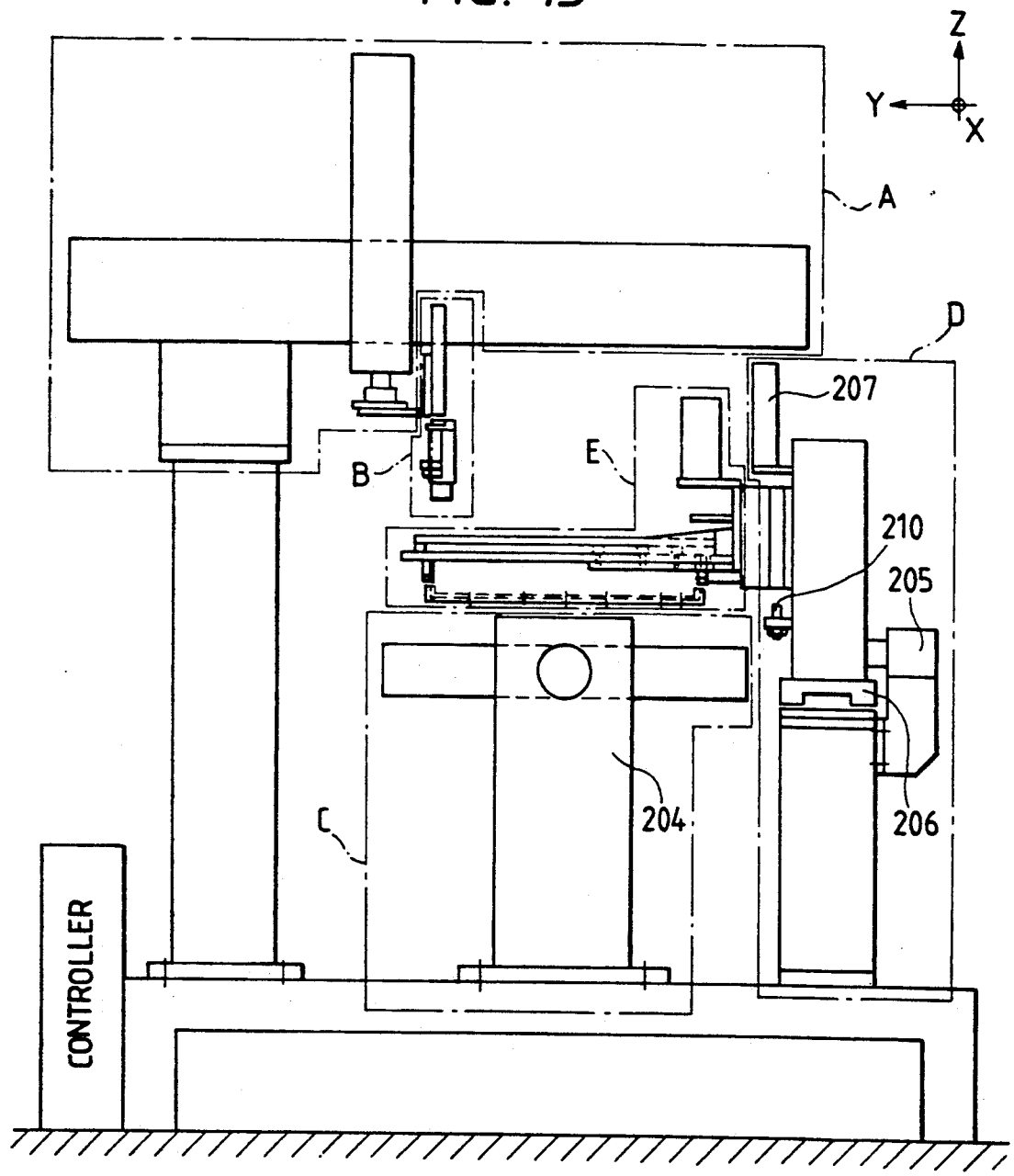

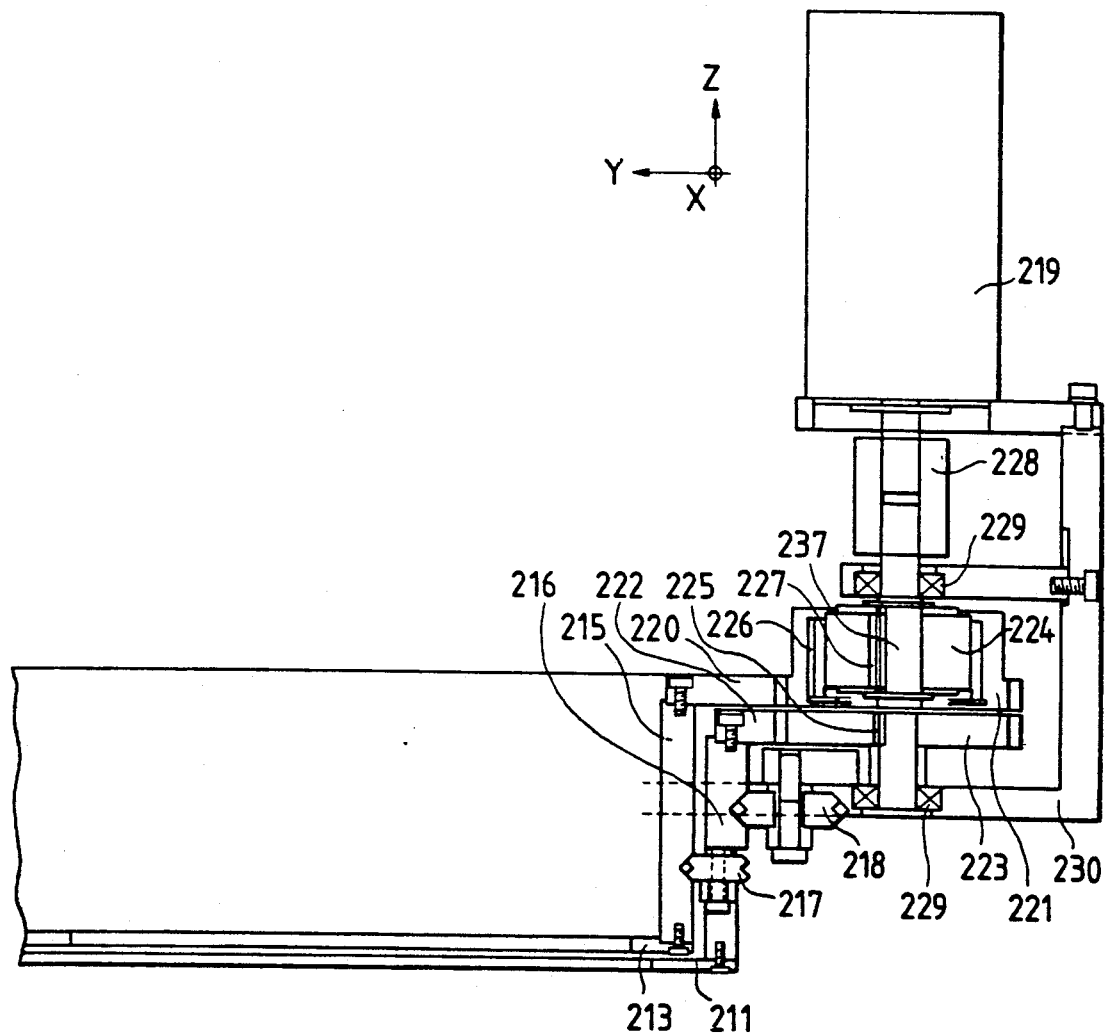

METHOD FOR MANUFACTURING A POROUS STATIC PRESSURE GAS BEARING

BACKGROUND OF THE INVENTION

1. Field of the Invention

This invention relates to a method of and an apparatus for manufacturing a porous static pressure gas bearing in which a porous material is disposed on the surface of a bearing and pressurized gas is injected from vent pores in the porous material into a minute gap between the porous material and a shaft to thereby form gas film and support the shaft, and particularly to a method of and an apparatus for adjusting the flow rate in the porous static pressure gas bearing.

2. Description of the Prior Art

To obtain bearing performances such as predetermined rotation accuracy, load capability and bearing rigidity in a porous gas bearing, it is required that when gas is supplied to a porous material under predetermined pressure, the flow rate of the gas injected per unit area on the surface of the bearing, i.e., the flow rate of passage of the gas, be uniform at a predetermined value over the whole surface of the bearing. As a method of adjusting such a flow rate, it has heretofore been practised to impregnate the surface of the bearing with resin and close pores in the porous material in advance so that the flow rate may be a predetermined rate or below, and thereafter suitably remove the resin by a solvent while measuring the flow rate of passage of the gas, and adjust the flow rate so as to become uniform. This method has involved rubbing the surface of the bearing with an applicator containing a suitable quantity of solvent to thereby dissolve the resin and repetitively effect adjustment while gradually recovering the flow rate.

In the prior art, however, the adjusting work has resorted to the operator's experience or sixth sense and therefore, the adjusting method has suffered from trial and error and has required a great number of working steps which has caused an increase in cost. Also, this method has resorted to manual work and therefore, it has been hard to standardize the work, which in turn has led to great irregularity of quality. Also, when the change-over of the flow rate adjusting surface of a large porous gas bearing is to be effected by manual work, the efficiency of work has been low and dangers have been involved.

SUMMARY OF THE INVENTION

The present invention has been made in view of the above-described circumstances and an object thereof is to provide a method of and an apparatus for manufacturing a static pressure gas bearing which can uniformize the flow rate of injected gas from a porous material easily and reliably.

The present invention applies a solvent to the surface of a bearing impregnated with resin through a uniformly apertured pattern to thereby enable the flow rate of passage of gas in a porous static pressure gas bearing to be set uniformly at a predetermined value.

It is another object of the present invention to provide a method of and an apparatus for manufacturing a porous static pressure gas bearing which can decrease the steps of work to thereby reduce the cost of manufacture and can achieve the standardization of the work and the stabilization of quality and which can be automated.

The present invention applies a solvent to the surface of a bearing impregnated with resin through a uniformly apertured pattern to thereby enable the flow rate of passage of gas in a gas bearing to be set uniformly at a predetermined value, and measures the flow rate of passage of gas in the surface of the bearing in advance to thereby discriminate whether it is over or under a prescribed flow rate, and selects recovering or filling the vent pores in the surface of the bearing in conformity with the result of the discrimination. The recovery of the vent pores can be realized, for example, by applying a solvent to the gas bearing with pressurized air supplied thereto. Also, the filling of the vent pores can be realized by applying a solvent to the gas bearing with no air supplied thereto.

Also, the present invention applies a solvent to the surface of a bearing impregnated with resin through a uniformly apertured pattern to thereby enable the flow rate of passage of gas in a gas bearing to be set uniformly at a predetermined value, and provides a plurality of kinds of said pattern differing in numerical aperture and measures the flow rate of passage of gas in the surface of the bearing prior to the application of the solvent, calculates the condition of selection of said pattern in conformity with the measured value of the flow rate, selects one of said plurality of kinds of patterns in conformity with the result of the calculation and effects the application of the solvent. This application of the solvent, if required, may be effected several times until the flow rate of passage of gas assumes a predetermined value, but in a mode of the present invention, the pattern selection before the second and subsequent applications of the solvent is effected on the basis of a variation in said measured value of the flow rate.

It is still another object of the present invention to provide a method of and an apparatus for adjusting the flow rate in a porous static pressure gas bearing which can be efficiently automated without the flow rate adjusting work being manually effected.

To achieve the above object, the present invention measures the flow rate on the surface of a bearing impregnated with resin by a flow meter, a spray, a mask and a uniformly apertured pattern, selects a pattern best suited for providing a predetermined flow rate of passage of gas from among uniformly apertured patterns having a plurality of kinds of numerical apertures and applies a solvent by the spray through the mask and this pattern to thereby enable the flow rate of passage of gas in the porous static pressure gas bearing to be set uniformly at a predetermined value.

Figure 5:
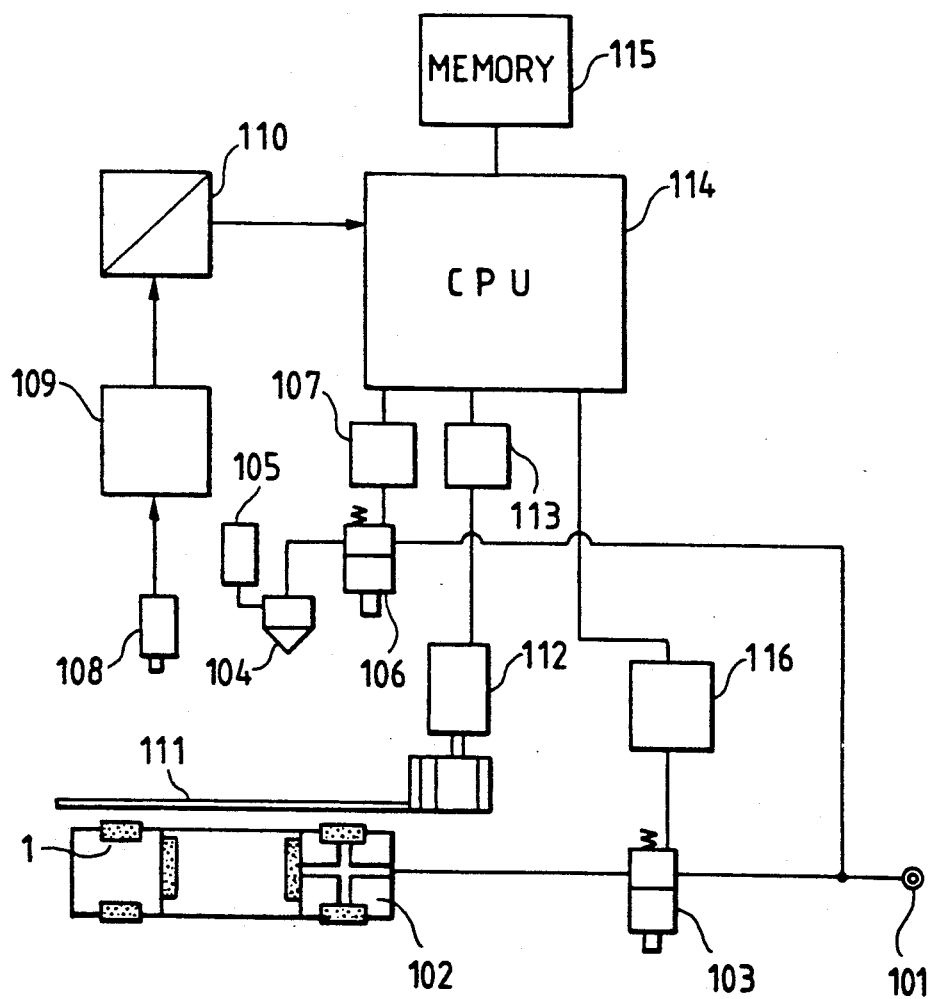
FIG. 5 shows the construction of a flow rate adjusting apparatus according to the present invention.
Figure 8:
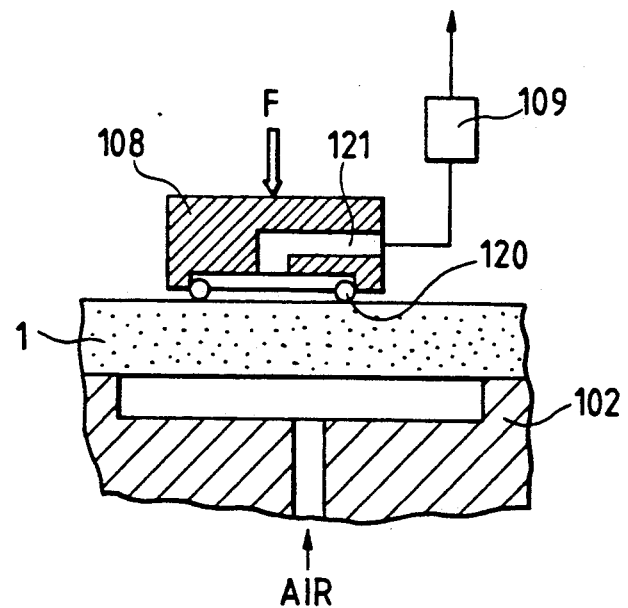

FIG. 8 is an enlarged view of the flow rate measuring portion in the apparatus of FIG. 5.

Figure 9B:
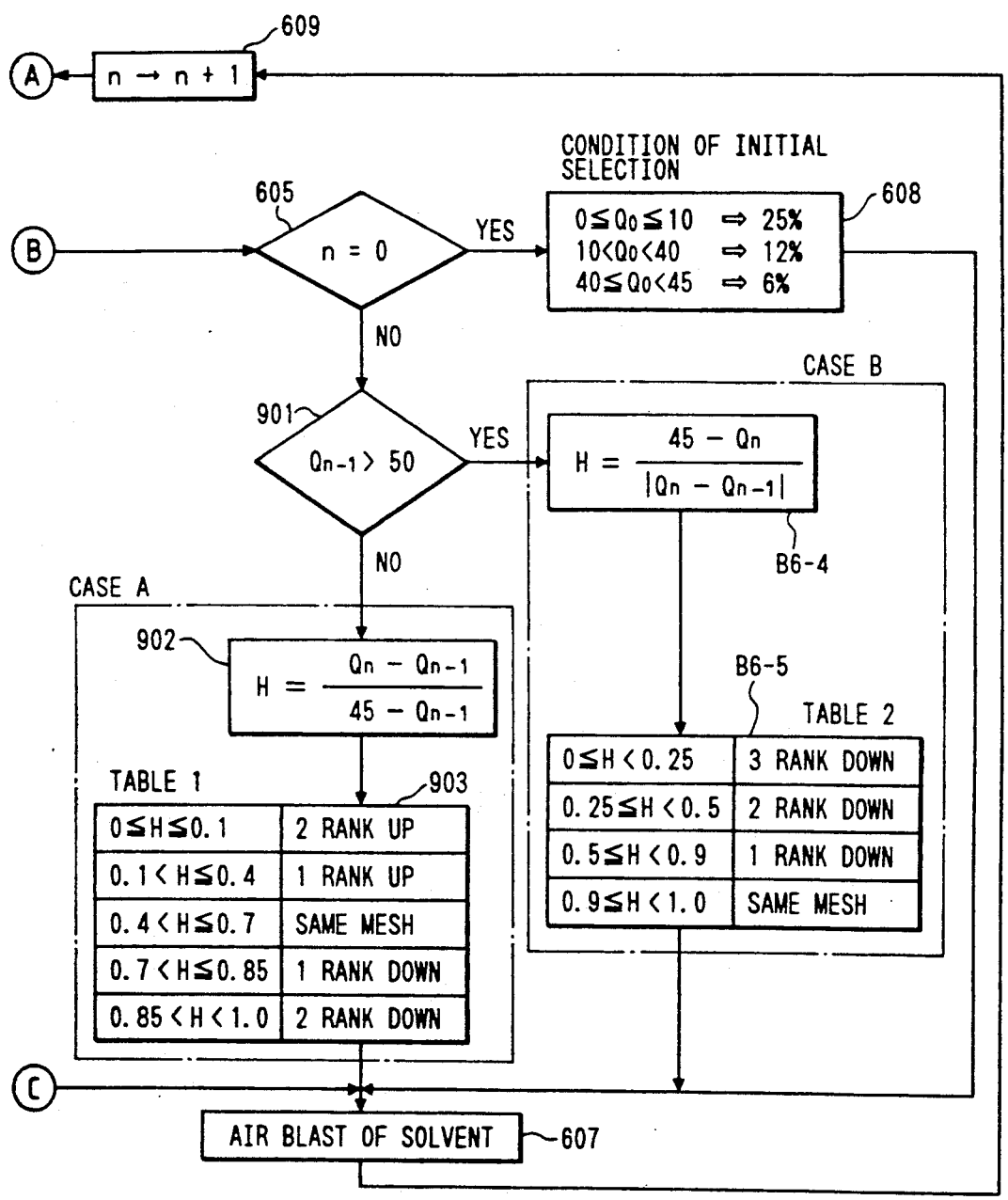

FIG. 9 is a flow chart for illustrating the selection of the pattern in the apparatus of FIG. 5.

Figure 10:
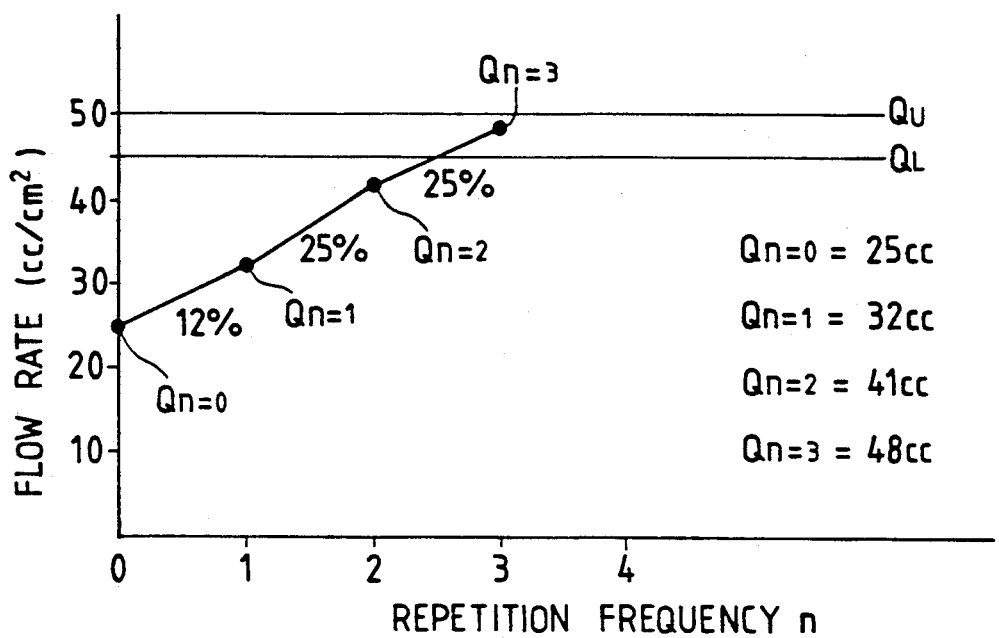

FIG. 10 is a graph for illustrating the flow rate adjusting process.

Figure 11:
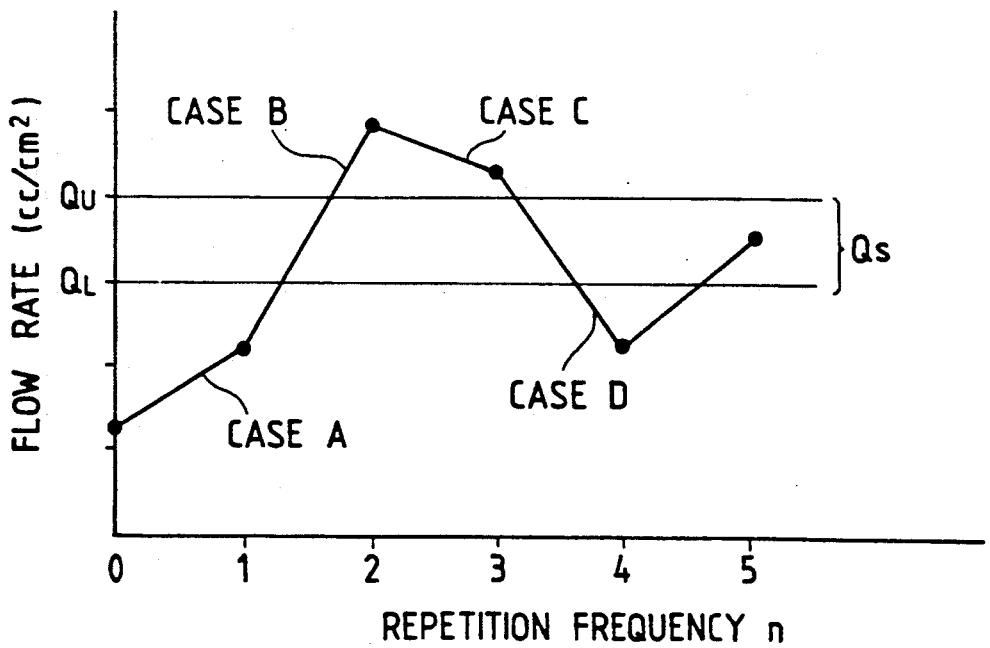

FIG. 11 is an illustration showing various forms of variation in the flow rate in the flow rate adjusting process of the present invention.

Figure 12:
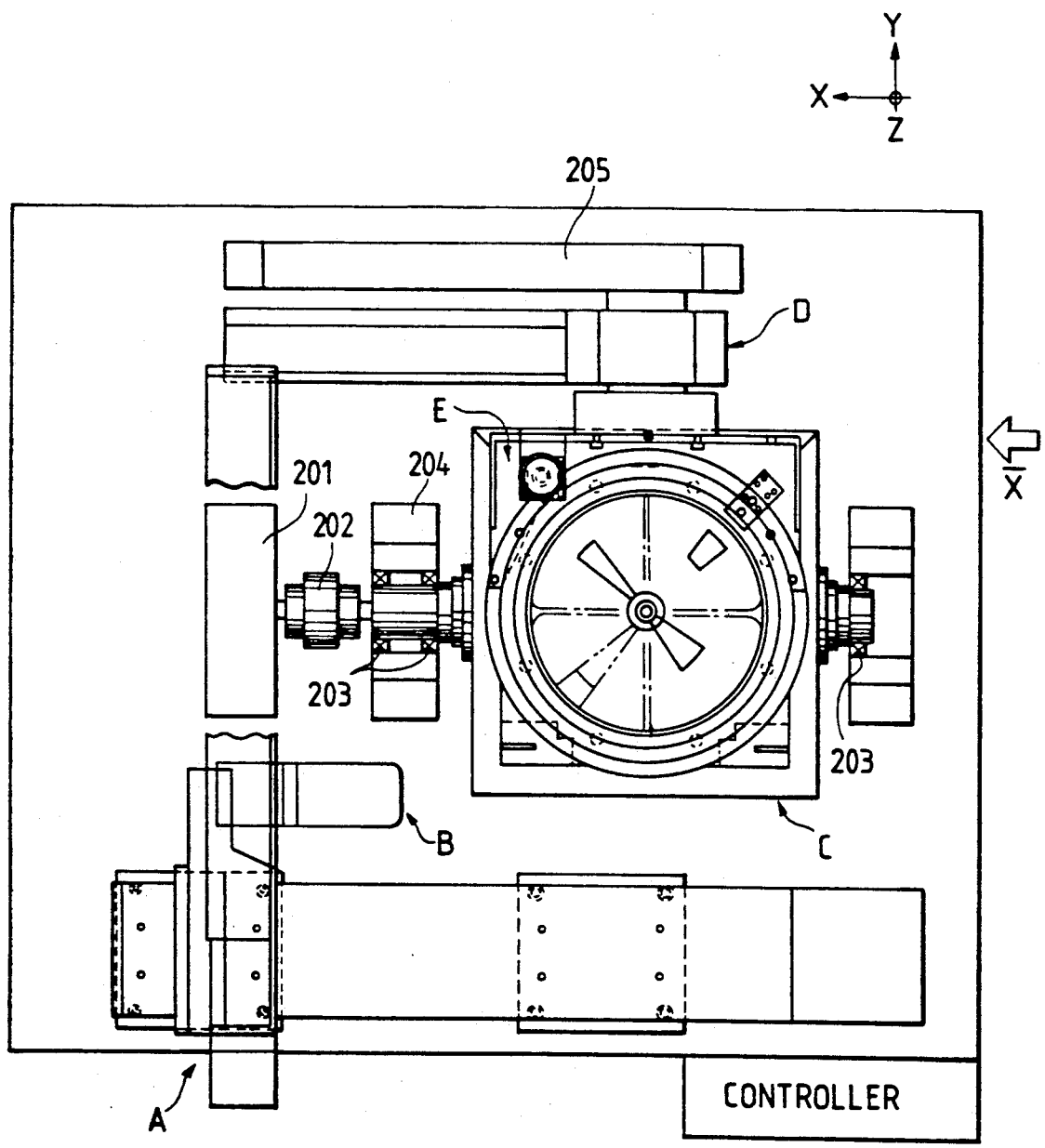

FIG. 12 is a plan view showing the construction of another embodiment of the present invention.

FIG. 13 is a side view of the FIG. 12 embodiment.

FIG. 14 is a partly cross-sectional view showing the essential portions of the apparatus.

Figure 15:
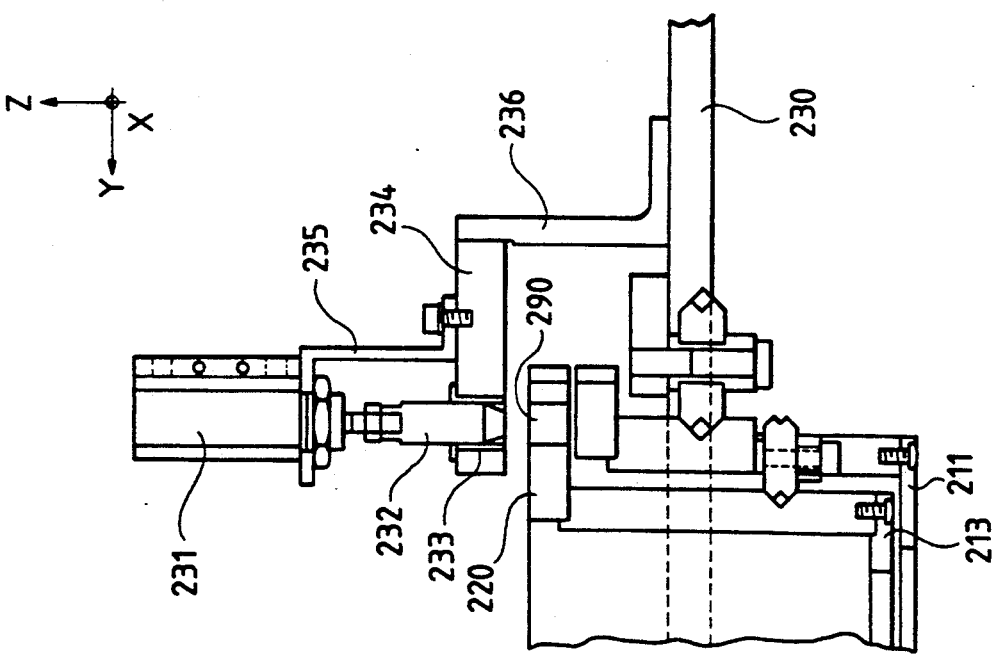

FIG. 15 is a cross-sectional view showing in greater detail the portions shown in FIG. 14.

Figure 16:
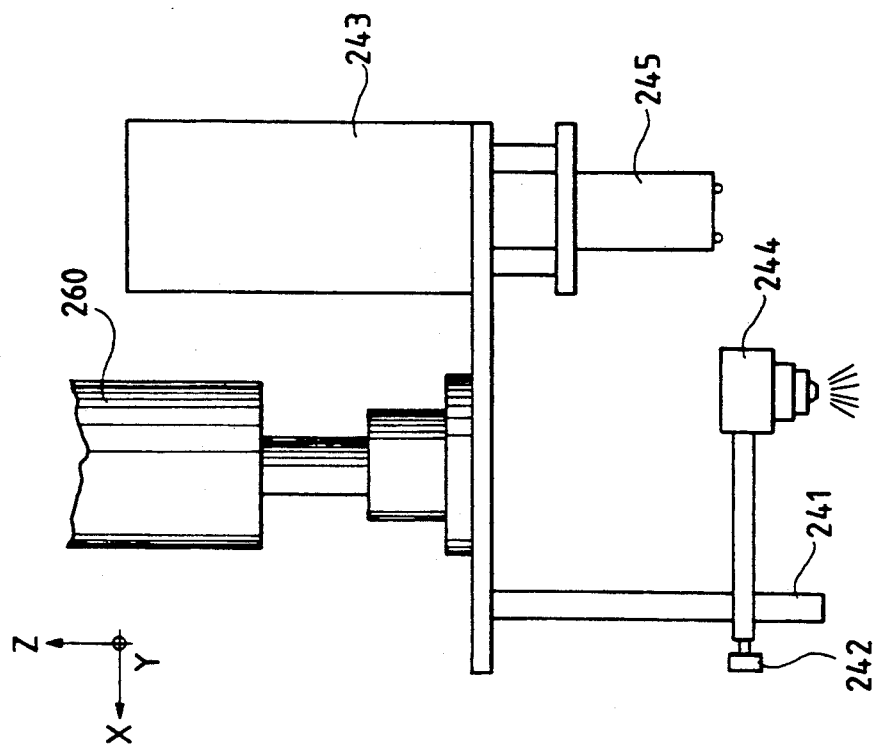

FIG. 16 is a fragmentary enlarged view showing the construction of the flow rate adjusting portion in the FIG. 12 embodiment.

Figure 17:
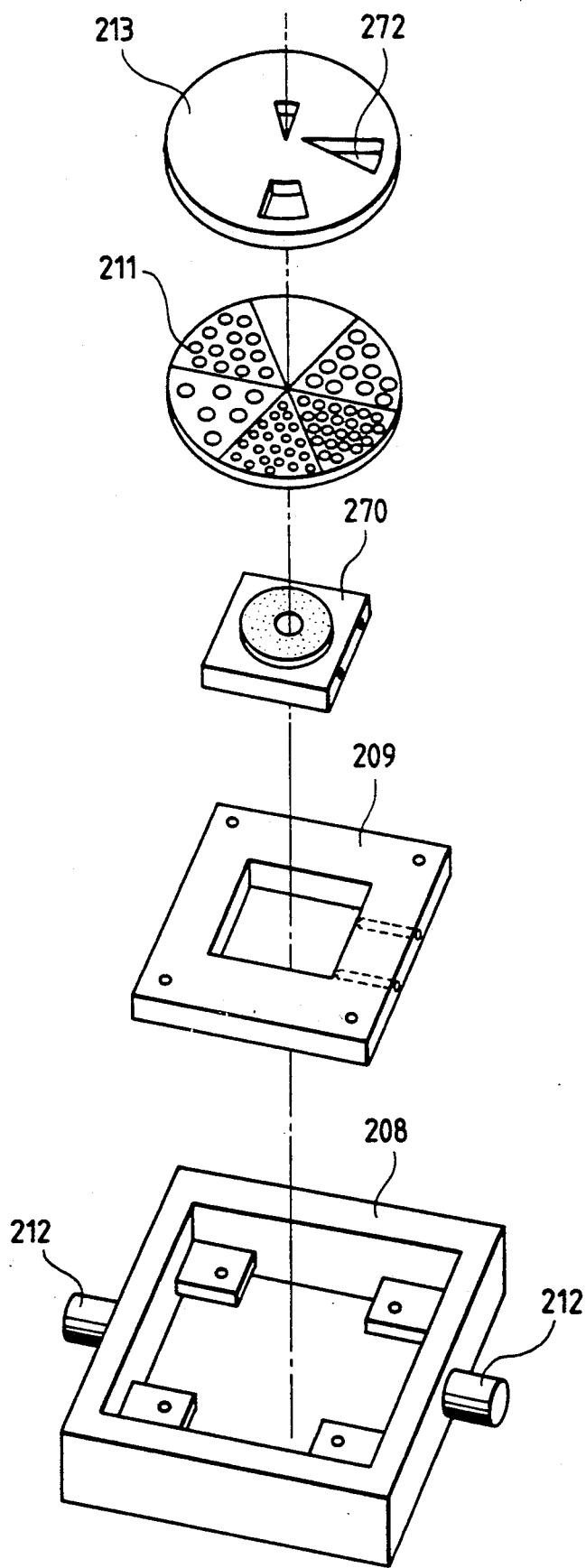

FIG. 17 is an exploded perspective view showing the construction of the essential portions of the apparatus.

Figure 18A:
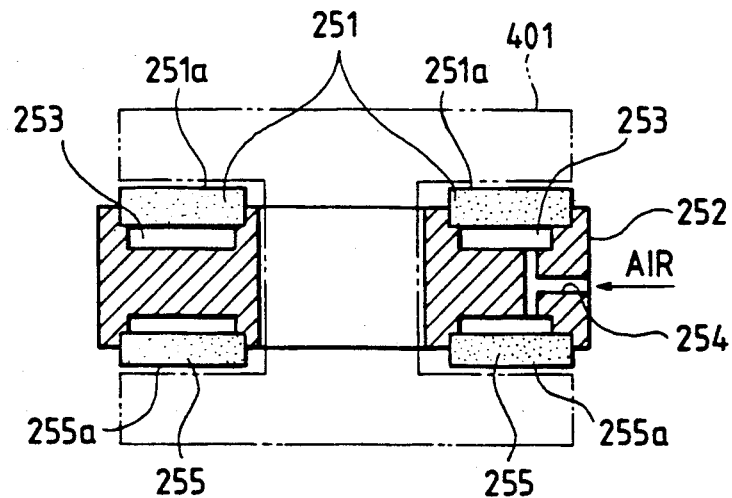
Figure 18B:
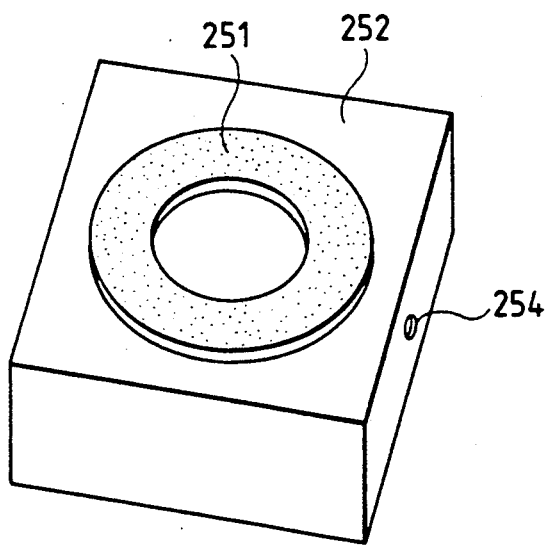

FIGS. 18A and 18B are a cross-sectional view and a perspective view, respectively, of a porous gas bearing.

Figure 19:
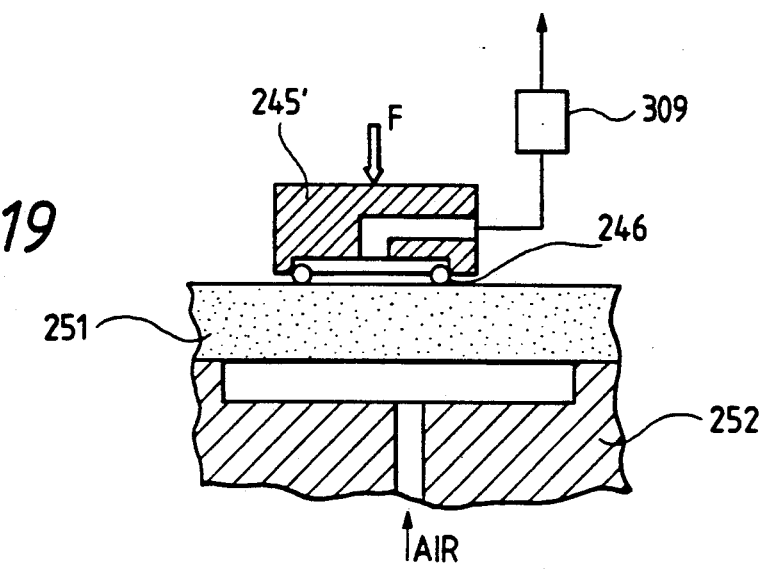

FIG. 19 shows the construction of a measuring pad used in the present invention.

Figure 20:
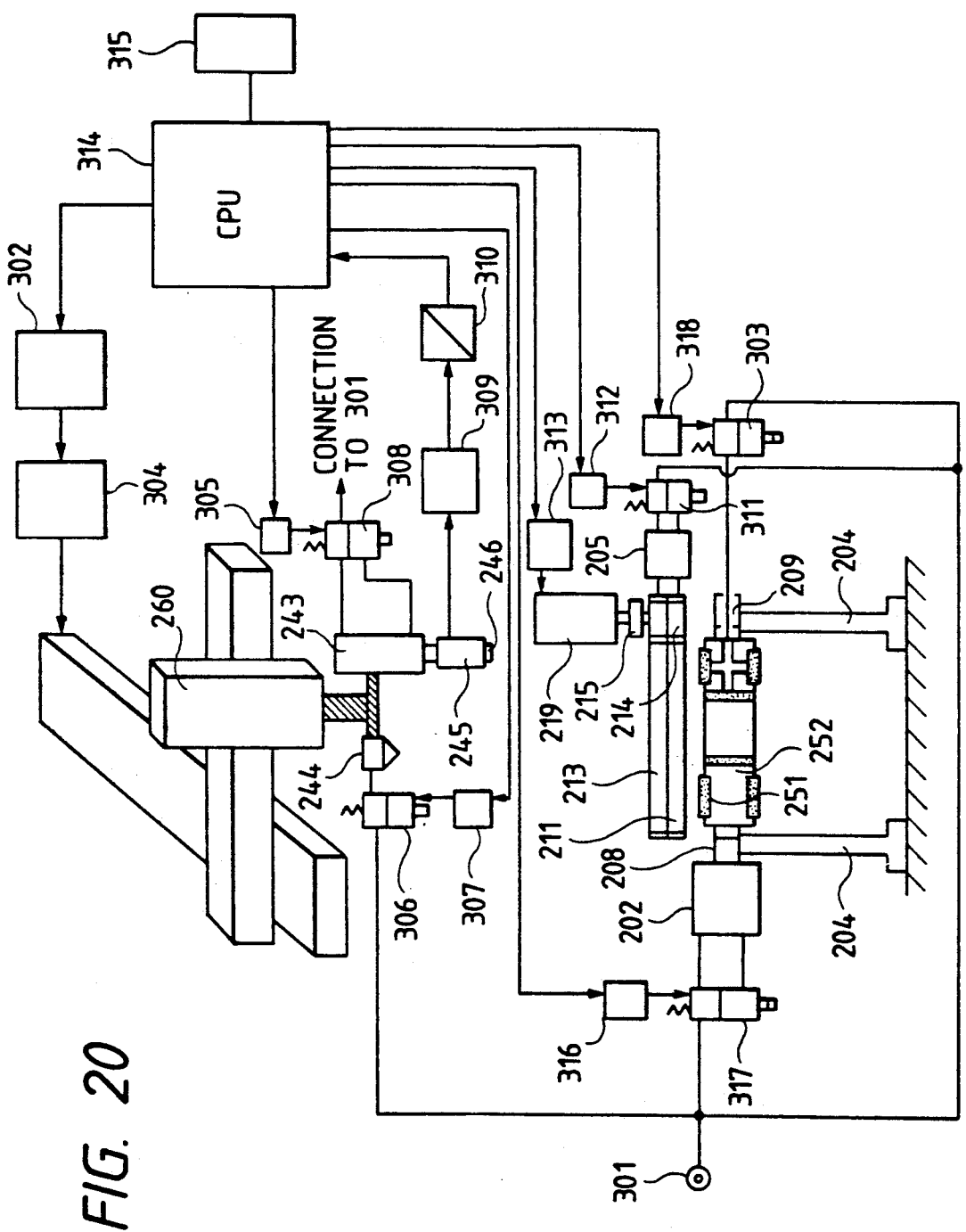

FIG. 20 is a block diagram showing the construction of the apparatus of the present invention.

DESCRIPTION OF THE PREFERRED EMBODIMENTS

Figure 1A:
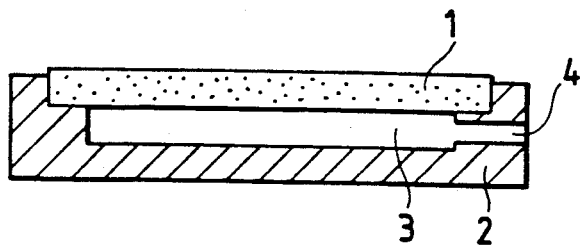
FIGS. 1A and 1B are a cross-sectional view and a perspective view, respectively, of a porous bearing.
Figure 1B:
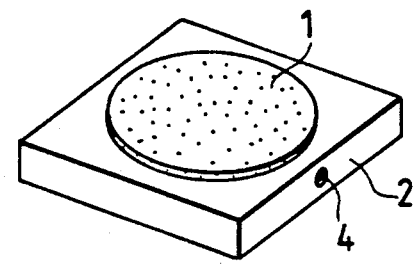

FIG. 1A is a cross-sectional view showing a porous bearing, and FIG. 1B is a pictorial view thereof. In these figures, the reference numeral 1 designates a graphite porous material, the reference numeral 2 denotes a housing for holding and fixing the porous material 1, the reference numeral 3 designates an air supply chamber, and the reference numeral 4 denotes a compressed air supply port.

Figure 2:
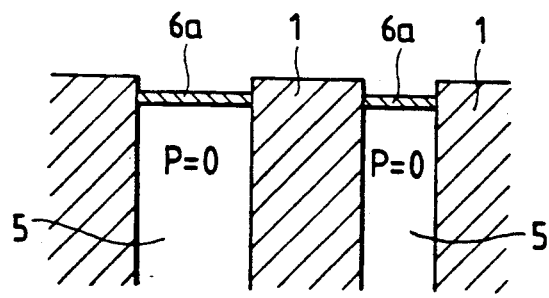
FIG. 2 is an enlarged cross-sectional view of a porous material as it is impregnated with resin.
Figure 3:
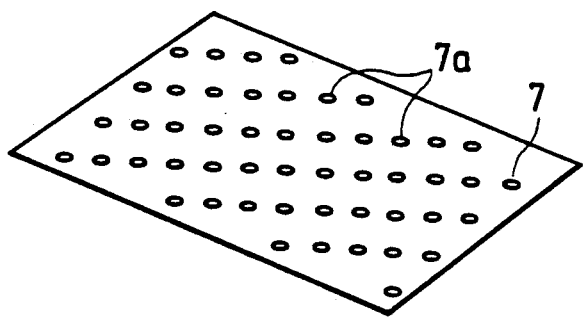
FIG. 3 is a pictorial view showing an example of a pattern for solvent application.

The porous material 1 finished to predetermined accuracy as by polishing work is made such that the flow rate of passage of gas therein is greater than the design value. Therefore, this is made coincident with the design value in accordance with the following procedure. The minute vent pores in the porous material 1 are first impregnated with resin. Any excess resin covering the surface of the bearing is then wiped off by a solvent, and resin film 6a is formed in the vent pores 5 as shown in FIG. 2, to thereby close the vent pores 5. Thereby, the flow rate of passage of gas is made smaller than the design value. Subsequently, a pattern 7 in which as shown in FIG. 3, small apertures 7a are uniformly distributed so as to have a predetermined numerical aperture disposed in opposed relationship with the porous material 1 so as to be parallel to the bearing surface of the porous material 1 and have a minute gap. Further, when a slight quantity of solvent is applied to the porous material 1 through the pattern 7 with the porous material 1 being vented, the resin impregnating the porous material 1 is dissolved correspondingly to the locations of the small apertures 7a in the pattern 7, whereby there is provided a predetermined flow rate of passage of gas. As the method of applying the solvent, there is a method of injecting the solvent in an atomized form. During this application of the solvent, the vent pores 5 can be opened (recovered) or closed (filled) depending on whether compressed air is supplied to the porous bearing.

In order to comprehensibly explain the principle of adjustment of the flow rate of passage of gas, cross-sectional views in which the vent bore portion of the porous material is enlarged and modelled are shown in FIGS. 4A, 4B, 4C and 4D.

Recovery of Vent Pores

Figure 4A:
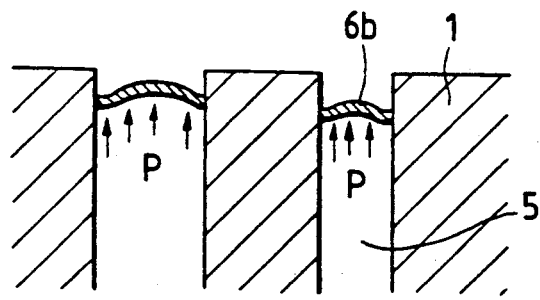
FIGS. 4A–4D are enlarged model illustrations of the porous vent pores of the present invention.
Figure 4B:
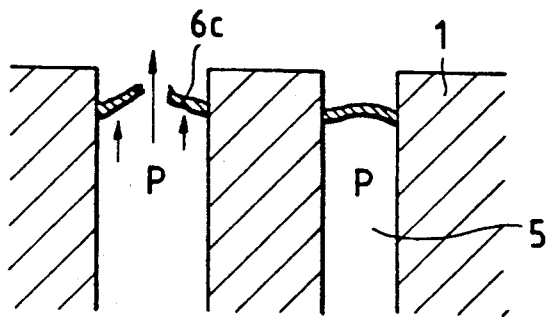

The vent bores 5 impregnated with resin are closed by resin film 6b, and with the porous bearing supplied with compressed air, pressure P is applied from within to the resin film 6b, as shown in FIG. 4A. In this state, the solvent which has passed through the pattern 7 arrives at the bearing surface and thereafter comes into some of the vent pores 5 to dissolve the resin film 6b in the vent pores 5. As a result, the resin film 6b is destroyed by the internal pressure P as indicated at 6c in FIG. 4B, and pressure gas flows out of the vent pores 5. Thereby, the vent pores 5 are opened (recovered). That is, a vent pore portion is thus formed on the bearing surface in accordance with the small apertures 7a (FIG. 3) in the pattern 7. In this case, the numerical aperture of the pattern can be increased or decreased to vary the application area of the solvent, thereby setting the flow rate of passage of gas in the bearing member uniformly at a predetermined value.

If as described above, use is made of a method of applying a solvent through a pattern having a predetermined numerical aperture, there is provided a predetermined flow rate of passage of gas. Thus, according to such a method, the trouble of performing the adjusting work repetitively as in the prior art can be saved to thereby reduce the cost of manufacture. Also, the standardization of the work becomes easy and quality is stabilized and automation can be achieved.

Filling of Vent Pores

Figure 4C:
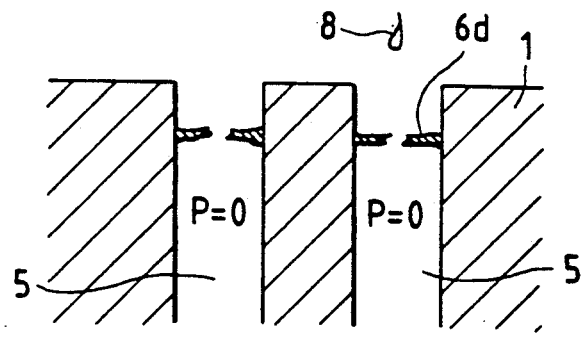
Figure 4D:
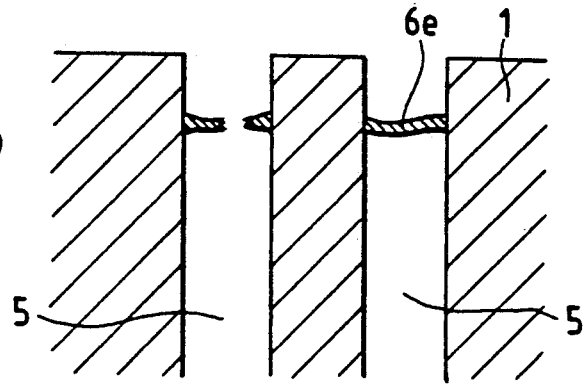

When as shown in FIG. 4C, the resin film 6d in the vent pores 5 is destroyed by the solvent, it is called filling to reproduce such resin film and close the vent pores 5. When a solvent is injected to the porous bearing through the pattern 7 in no air supply state (pressure P=0), the solvent 8 arrives at the surface of the bearing and thereafter comes into some of the vent pores 5 and dissolves the resin film 6d in the vent pores 5. The dissolved resin, as shown in FIG. 4D, is reproduced into complete resin film 6e by the surface tension thereof and solidifies on the spot, thereby closing the vent pores 5.

By these recovery and filling processes, the vent pores 5 are opened and closed and during the processes, the numerical aperture of the pattern 7 is increased or decreased to vary the area to which the solvent 8 is applied, whereby the flow rate of passage of gas in the bearing member can be set uniformly at a predetermined value.

Figure 6:
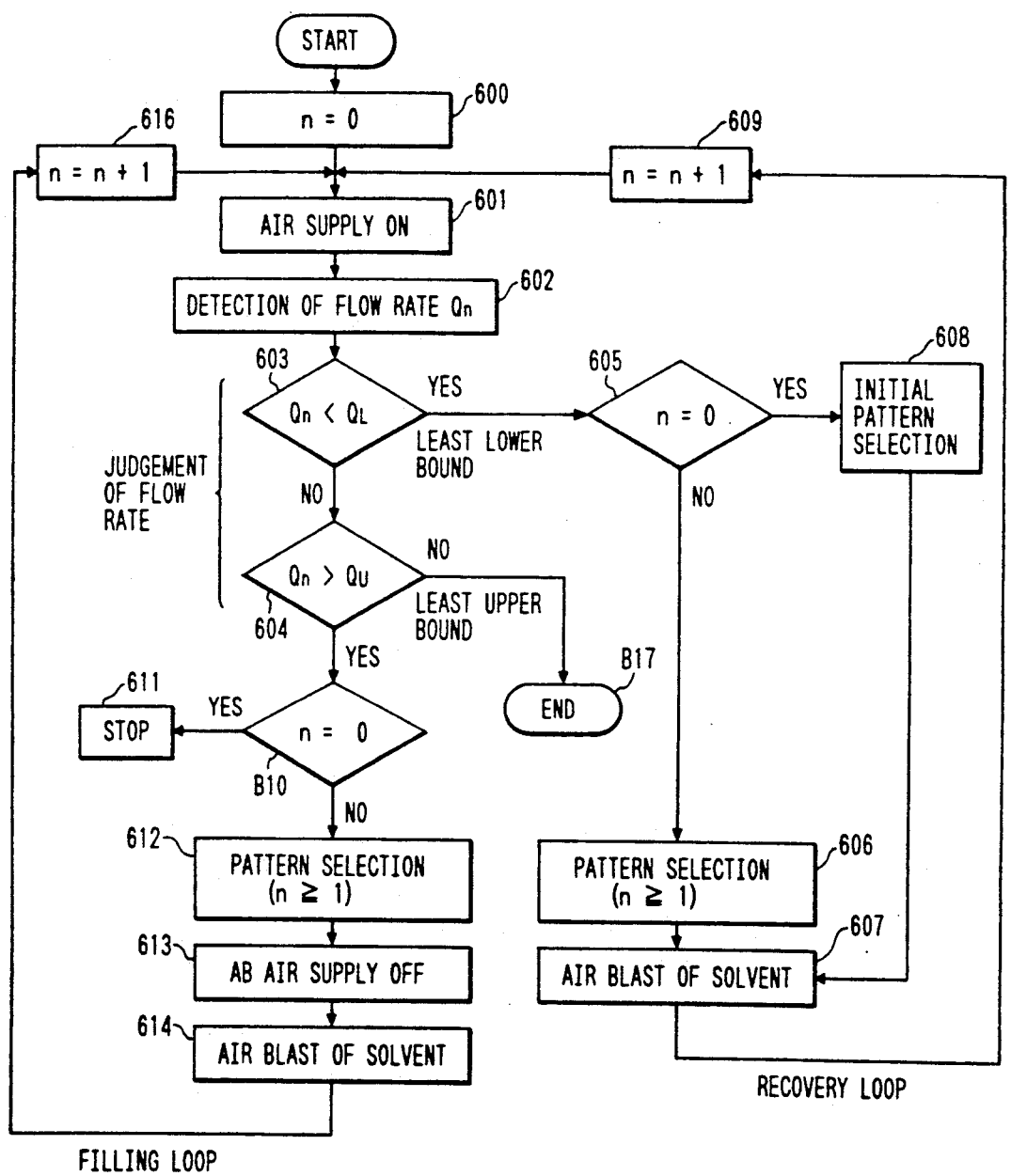
FIG. 6 is a flow chart for illustrating the flow rate adjustment in the apparatus of FIG. 5.
Figure 7A:
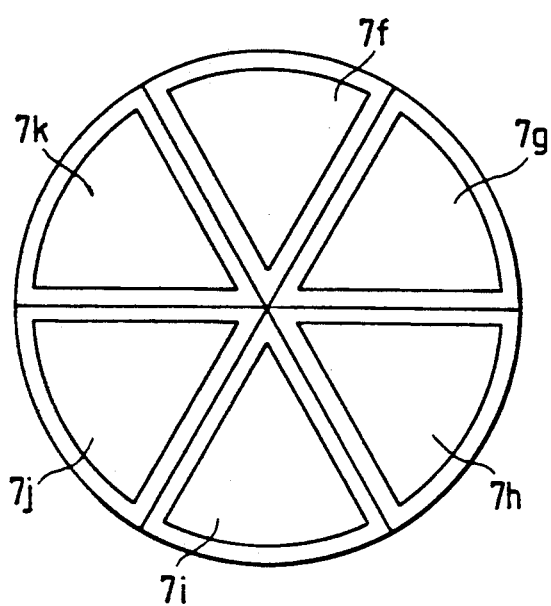
FIGS. 7A and 7B are a pictorial view of a disk formed with a pattern used in the apparatus of FIG. 5 and an enlarged view of the pattern on the disk, respectively.
Figure 7B:
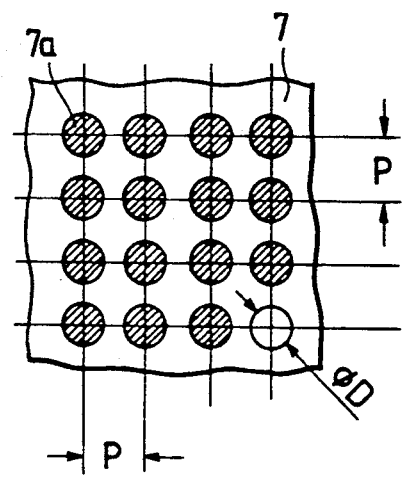

The actual method of adjusting the flow rate of passage of gas will now be described in detail. FIG. 5 is a block diagram showing the construction of a flow rate adjusting apparatus according to an embodiment of the present invention, and FIG. 6 is a flow chart showing the flow rate adjusting method in the apparatus of FIG. 5. In FIG. 5, the reference numeral 101 designates a compressor which is a supply source of compressed air, and the reference numeral 102 denotes a porous bearing for adjusting the flow rate of passage of gas. The porous bearing 102 is connected to the compressor 101. The reference numeral 103 designates a three-way solenoid valve connected between the porous bearing 102 and the compressor 101 for controlling the supply of air to the porous bearing 102, the reference numeral 104 denotes a spray gun for applying a solvent to the surface of the porous bearing 102, the reference numeral 105 designates a tank for supplying the solvent to the spray gun 104, the reference numeral 106 denotes an solenoid valve for controlling the supply of air to the spray gun 104, and the reference numeral 107 designates a driver for operating the solenoid valve 106. The solenoid valve 106 is connected between the spray gun 104 and the compressor 101. The reference numeral 108 denotes a measuring pad for detecting the flow rate of gas flowing out from the bearing surface of the porous static pressure bearing 102, and the reference numeral 109 designates a sensor for converting the detected flow rate introduced from the measuring pad into an electrical signal. An O-ring 120 made of rubber is disposed at the lower end of the measuring pad 108, as shown in FIG. 8, so that air injected from the surface of the porous material 1 of the bearing 102 may be directed to the sensor 109 via a conduction hole 121. In FIG. 5, the reference numeral 110 denotes an A/D converter for digitally converting the electrical signal. The reference numeral 111 designates a disk having a pattern for increasing or decreasing the area to which the solvent injected from the spray gun 104 is applied. The disk 111 is divided into six portions as shown in FIG. 7A, and patterns 7f-7k whose numerical apertures are set to 100%, 50%, 25%, 12%, 6% and 3%, respectively, are formed on the six divided portions, respectively. The pattern 7f is entirely constituted by an opening. The patterns 7g-7k each, as enlargedly shown in FIG. 7B, comprise small apertures 7a formed at an equal pitch in a stainless steel plate having a thickness of the order of 0.1 mm by etching. The respective patterns 7g-7k are made in accordance with the specification shown in Table 1 below.

TABLE 1

| Pattern Symbol | Diameter of Aperture (mm) | Pitch (mm) | Numerical Aperture (%) |
|---|---|---|---|
| 7g | 0.5 | 0.63 | 50 |
| 7h | 0.5 | 0.89 | 25 |
| 7i | 0.5 | 1.28 | 12 |
| 7j | 0.5 | 1.81 | 6 |
| 7k | 0.5 | 2.56 | 3 |

In FIG. 5, the reference numeral 112 denotes a stepping motor for effecting pattern indexing, the reference numeral 113 designates a driver for driving the stepping motor 112, the reference numeral 114 denotes a CPU, the reference numeral 115 designates a memory, and the reference numeral 116 denotes a driver for driving the three-way solenoid valve 103.

The operation of the apparatus of FIG. 5 will now be described.

With air supplied to the porous bearing 102, the flow rate detecting pad 108 is brought into intimate contact with the adjusting portion of the bearing surface to thereby detect the flow rate of passage of gas. The detected flow rate is converted into an electrical signal by the sensor 109 and introduced into the CPU 114 through the A/D converter 110. The CPU 114 judges which of recovery or filling should be effected, and puts out a command to the solenoid valve 103 and controls the ON and OFF of the supplied air. The CPU 114 then performs a calculation for determining the pattern to be used for recovery or filling, and puts out a command conforming to the result of the calculation to the driver 113 for the stepping motor. Thereby the stepping motor 112 is driven and a pattern of a predetermined numerical aperture is selected from among the patterns 7f-7k.

Subsequently, under the control of the CPU 114, the spray gun 104 is disposed with a predetermined distance kept relative to the adjusting portion of the bearing surface. A command is then put out from the CPU 114 to the driver 107 and the solenoid valve 106 is energized for a predetermined time, whereby the spray gun 104 is supplied with air and injects the solvent in its atomized form from the nozzle thereof. The injected solvent is applied to the bearing surface of the bearing 102 through one of the patterns 7f-7k.

The operation of the CPU 114 of FIG. 5 in the adjusting process will now be described on the basis of the flow of FIG. 6.

When a new porous bearing 102 is set as shown in FIG. 5, the CPU 114 resets repetition frequency n (n=0) (step 600), and thereafter executes the following adjusting process.

First, the solenoid valve 103 is changed over to the porous bearing 102 side by the driver 116 and the air supply from the compressor 101 to the bearing 102 is rendered ON (step 601). By the air supply being thus rendered ON, the sensor 109 detects the flow rate of the air injected from the bearing surface of the porous bearing 102 and introduced into the detecting pad 108. The A/D converter 110 converts this detected flow rate into a digital value $Q_n$. The CPU 114 introduces this detected flow rate value $Q_n$ thereinto (step 602), and judges whether this detected flow rate value $Q_n$ satisfies the design value ($Q_s = Q_u \sim Q_L$) (step 603). If the detected flow rate value $Q_n$ is below the design lower limit value $Q_L$, the flow rate recovering loop on the right-hand side in FIG. 6 is entered to recover the flow rate.

In this recovering loop, judgment of the repetition frequency n is first effected (step 605), and if n=0, a predetermined initial pattern (e.g. the pattern 7j) is selected (step 608). On the other hand, if n≧1, a pattern is selected on the basis of the relation between the detected flow rate value $Q_n$ introduced at the step 602 in the current adjusting process and the detected flow rate value $Q_{n-1}$ introduced during the last adjusting process (step 606). The solenoid value 106 is then energized through the driver 107 and the pressurized air from the compressor 101 is supplied to the spray gun 104. Thereby the solvent is sprayed from the spray gun 104 and applied to the bearing surface of the porous bearing 102 (step 607). Then, 1 is added to the repetition frequency n (step 609), whereafter return is made to the step 601, and an operation similar to what has been described above, including the flow rate detection of the step 602 and the subsequent steps, is repeated.

If in the judgment at the steps 603 and 604, the detected flow rate value $Q_n$ satisfies the range of the design value $Q_s = Q_u \sim Q_L$, this flow rate adjusting process is terminated. However, if the detected flow rate value $Q_n$ should be over the upper limit value $Q_u$, the program enters the filling loop on the left-hand side in FIG. 6 in which the resin film 6d (FIGS. 4C and 4D) in the vent pores 5 is reproduced to reduce the flow rate to the design upper limit value $Q_u$ or below and the vent pores 5 are closed.

In this filling loop, judgment of the repetition frequency n is first effected as at the step 605 in the recovering loop (step 610). If n=0 at this time, the porous bearing 102 ought to have its all vent pores 5 closed by the impregnating resin and be unable to be filled any more and therefore, this is judged as an error and the operation is stopped (step 611). If n≧1, predetermined one of the patterns 7f-7k is selected on the basis of the relation between the detected flow rate values $Q_n$ and $Q_{n-1}$, as at the step 606 in the aforedescribed recovering loop 606 (step 612). Subsequently, the solenoid valve 103 is controlled to reduce the flow rate and the air supply to the porous static pressure bearing 102 is stopped (step 613). Further, the solvent is sprayed from the spray gun 104 and applied to the bearing surface (step 614). Subsequently, 1 is added to the repetition frequency n (step 616), whereafter return is made to the step 601, where the solenoid valve 103 is controlled to supply the air to the bearing 102 again (step 601), and the flow rate detection of the step 602 is effected. Thereafter, a process similar what has been described is repeated.

The method of selecting the patterns 7f-7k in the present invention will now be described. This selecting method comprises preparing a plurality of pattern selection tables corresponding to conditions such as the detected flow rate and the adjustment repetition frequency n, memorizing them in the memory 115, reading out and referring to the corresponding table on the basis of the discrimination flow in the adjusting process, thereby effecting the selection of a pattern.

i) Initial Pattern Selection

The initial pattern selection is effected on the condition that the repetition frequency n=0 and by reference to the value of $Q_n$ and the initial condition selection table set in the memory.

ii) Pattern Selection

From the relation between the last measured flow rate value $Q_{n-1}$ and the current measured flow rate value $Q_n$, a pattern selection table conforming to the form of variation in the flow rate is memorized in the memory and the next pattern is selected on the basis of that table.

There are the following four forms of variation in the detected flow rate which require flow rate adjustment:

| Case A: | case where $Q_n < Q_L$ and $Q_{n-1} < Q_L$ |
| Case B: | case where $Q_n < Q_L$ and $Q_{n-1} > Q_U$ |
| Case C: | case where $Q_n > Q_U$ and $Q_{n-1} < Q_L$ |
| Case D: | case where $Q_n > Q_U$ and $Q_{n-1} > Q_U$ |

Pattern selection tables are prepared in conformity with the respective cases. Also, a table reference coefficient H corresponding to each case is set to facilitate the reference to each table. The table reference coefficient H is calculated from a calculation formula for each case on the basis of the relations among the flow rates $Q_L$, $Q_U$, $Q_n$ and $Q_{n-1}$.

The processes of the initial pattern selection block (step 608) and the pattern selection block (steps 606 and 612) in the flow chart of FIG. 6 will hereinafter be described in detail with reference to the flow chart of FIG. 9. In FIG. 9, processes similar to those in FIG. 6 are given the same step numbers as those in FIG. 6. Also, to facilitate the description, it is to be understood here that the design flow rate value $Q_s$ (=$Q_L$~$Q_U$) is set to the range of 45-50 cc/cm².

Case A will first be described. Referring to FIG. 9, the flow rate $Q_{n=0}$ in the porous bearing 102 (FIG. 5) after the initial filling (resin impregnation) has been effected is measured (steps 600-602) and subsequently, whether this measured flow rate value (the detected flow rate) is equal to or less than the prescribed flow rate $Q_L$ is discriminated (step 603). Here, $Q_{n=0} < Q_L$ (=45). Next, the repetition frequency n is discriminated (step 605), and since n=0, advance is made to the initial condition selection block (step 608), in which reference is made to the initial condition selection table, and the mesh (patterns 7f-7k) used in the next solvent injection is selected. The solvent is injected through this mesh (step 607), whereafter the repetition frequency n is advanced by 1 (step 609). Subsequently, the flow rate $Q_{n=1}$ is measured (step 602), and since $Q_{n=1} < Q_L$ in the discrimination at the step 603, advance is made to step 605. Further, since n=1, advance is made to the filter selection flow of step 901 and subsequent steps on the basis of the discrimination which is n>0 (step 605). If here, $Q_{n-1}$ (=$Q_{n=0}$)<45, at step 902, a calculation defined by $$H = \frac{Q_n - Q_{n-1}}{45 - Q_{n-1}}$$

is effected to find the value of H. Subsequently, the table 1 is called up from the memory, and the table 1 is referred to at the value of H found at step 902, and the rank of the mesh to be used in the next solvent injection (the rank to change from the current mesh) is determined.

The process from after the initial filling (resin impregnation) is effected until a predetermined flow rate is obtained on the basis of the above-described flow will now be described specifically with reference to FIG. 10.

First, if the flow rate at the repetition frequency n=0 is $Q_{n=0}$=25 cc/cm², the mesh of 12% is selected from the condition of initial selection (the step 608 of FIG. 9). The injection of the solvent is effected by this mesh, whereafter $Q_{n=1}$=32 cc/cm² is measured. At this time, $Q_n = Q_{n=1} = 32$ cc/cm² < 45 cc/cm² and $Q_{n-1} = Q_{n=0} = 25$ cc/cm² < 45 cc/cm² and therefore, this corresponds to the aforedescribed Case A.

Accordingly, at step 902, the calculation formula $$H = \frac{Q_n - Q_{n-1}}{45 - Q_{n-1}}$$

is calculated to obtain $$H = \frac{Q_n - Q_{n-1}}{45 - Q_{n-1}} = \frac{Q_{n=1} - Q_{n=0}}{45 - Q_{n=0}} = \frac{32 - 25}{45 - 25} = 0.35.$$

This H=0.35 is referred to in the table 1 to obtain "mesh 1 rank up" (step 903). As regards the rank up of mesh, in the case of the pattern shown in FIG. 7A, the case where the numerical aperture becomes greater is called rank up, and the case where the numerical aperture becomes smaller is called rank down. Now, this is 1 rank up for the mesh 12% and thus, the mesh 25% is selected.

Subsequently, the injection of the solvent is effected by the use of the mesh 25%, whereafter $Q_{n=2}$=41 cc/cm² is measured. Again in this case, $Q_{n-1}(=Q_{n=1})<45$ cc/cm$^2$ and $Q_n=Q_{n=2}<45$ cc/cm$^2$ and therefore, this corresponds to the Case A.

Accordingly, the equation $$H = \frac{Q_n - Q_{n-1}}{45 - Q_{n-1}}$$

is used to obtain $H_A=0.69$. $H_A=0.69$ is referred to in the table 1 to obtain a command for "same mesh" (same rank) (step 903). Thus, the next solvent injection is effected by the use of the mesh of 25%. In FIG. 10, the third measured value $Q_{n=3}=48$ cc/cm$^2$ is obtained and adjustment is terminated.

FIG. 11 shows the states of variation in the flow rate in respective ones of the Case A, the Case B, the Case C and the Case D.

As shown in FIG. 11, the Case A refers to a variation less than the lower limit in a predetermined flow rate, the Case B refers to a variation from less than the lower limit to above the upper limit, the Case C refers to a variation beyond the upper limit, and the Case D refers to a variation from above the upper limit of Q to less than the lower limit. The Cases B-D are used for the modification when the flow rate adjustment in the Case A is not confined within the prescribed flow rate.

According to the method as described above, a predetermined flow rate of passage of gas is obtained by applying the solvent through a pattern having a predetermined numerical aperture. Accordingly, the trouble of performing the adjusting work repetitively as in the prior art is saved and the cost of manufacture is reduced. Also, the standardization of the work becomes easy and quality is stabilized and automation can be achieved. Further, where the numerical aperture becomes greater than the design value, the filling process can be continuedly carried out, and this is effective for reducing the rate of defectiveness and enhancing the work efficiency.

FIG. 12 is a general plan view of an apparatus according to another embodiment of the present invention, and FIG. 13 is a side view of the apparatus as it is seen in the direction of arrow $\overline{X}$. In these figures, the letter A designates an orthogonal three-axis (X, Y and Z axes) NC robot which moves the solvent applying spray nozzle 244 and flow rate measuring detection pad 245 of a flow rate adjusting portion B toward the bearing surface of a porous static pressure gas bearing to be adjusted in flow rate by a preset program (see FIG. 16). The letter C denotes an inversion unit which is driven by an air actuator 201 during the automatic change-over of the bearing surface in which the flow rate is adjusted. The reference numeral 202 designates a flexible coupling, the reference numeral 203 denotes rotational bearings, and the reference numeral 204 designates a mounting bed for the rotational bearings 203. Referring to FIG. 17 which shows a mounting portion E for a workpiece or the like, the reference numeral 208 denotes a mounting frame for fixing a static pressure gas bearing setting jig 209. The mounting frame 208 is reversible about shafts 212 provided on the opposite sides thereof. The letter D designates a shift unit which is moved along a slide guide 206 by the drive of a rodless cylinder 205 to retract the unit of the mounting portion E during the automatic change-over of the bearing surface. The mounting portion E is provided with a mechanism capable of selecting a pattern 211 best suited for obtaining a predetermined flow rate by a preset program with the aid of rotative indexing and further effecting the rotative indexing of a mask 213, and is movable vertically (in the direction of the Z axis) by the drive of an air cylinder 207 mounted in the shift unit D.

FIG. 14 is a cross-sectional view of the portion E. In FIG. 14, the reference numeral 211 designates a pattern having different numerical apertures in a plurality of kinds of sector ranges as shown in FIG. 17. The reference numeral 213 denotes a mask having a plurality of sector openings 272 for finely dividing the flow rate adjustment range to provide a preset uniform flow rate in the bearing surface. This mask 213 is provided with several kinds of sector openings 272 in the same disk-like surface, as shown in FIG. 17, whereby it can accomplish flow rate adjustment without replacing static pressure gas bearings of various sizes with one another. A mask holder 215 fixes the mask 213 by means of a bolt, and is suspended in the cut-away portion of a cylindrical part 216 by several guide bearings 217 disposed on the same circumference and fixed by bolts. Also, the mask 213 is rotatively indexed by a stepping motor 219 on the basis of a preset program through a ring gear 220 fixed to the other end surface of the mask holder 215 by a bolt and a gear 221 containing a one-way cam clutch 224 therein. The cylindrical part 216 fixes the pattern 211 by a bolt, and is suspended on a part 230 by several guide bearings 218 disposed on the same circumference and fixed by bolts. The pattern 211 is rotatively indexed by the stepping motor 219 through a ring gear 222 fixed to the other end surface of the cylindrical part 216 and a gear 223 connected thereto by a shaft 237 and a key 225. At this time, the shaft 237 and the gear 221 idly rotate due to the one-way clutch 224 and the mask 213 does not receive the drive of the stepping motor 219. The reference numeral 228 designates a flexible coupling for connecting the shaft 237 and the stepping motor 219 together, and the reference numeral 229 denotes the rotational bearings of the shaft 237. The reference numeral 230 designates a fixing bracket provided with guide bearings 218 and a stepping motor mounting portion.

In FIG. 15, the reference numeral 231 denotes an air cylinder for driving a fixing pin 232 for the mask 213 during the indexing of the pattern 211. The pin 232 fits in a pin-hole 290 disposed in the gear 220 on the same circumference thereof. A bushing 233 is a guide for the pin 232. The reference numeral 234 designates a plate for mounting the bushing 233 thereon, and the reference numeral 235 denotes a bracket for mounting the cylinder 231 thereon. The bracket 235 is fixed to the plate 234 by bolts. The reference numeral 236 designates a bracket for mounting the plate 234 thereon. The bracket 236 is fixed to the bracket 230 by bolts. FIG. 16 is an enlarged view of the portion B (see FIG. 13) mounted on the vertical (Z axis) shaft 260 of the NC robot. The reference numeral 241 denotes a spray nozzle fixing rod fixed to a spray nozzle 244 by a set screw 242. The reference numeral 245 designates a detection pad having a ring-like resilient member 246 secured to the bearing-contacting portion thereof during the measurement of the flow rate. The detection pad 245 is fixed to the shaft end of a cylinder 243 with anti-rotation means.

The details of the detection pad 245 are shown in FIG. 19. The reference numeral 245' denotes a measuring pad for detecting the flow rate flowing out from a bearing surface (porous material) 251. The reference numeral 309 designates a sensor for converting the flow rate introduced by the measuring pad 245' into an electrical signal. As shown in FIG. 19, an O-ring 246 made of rubber is disposed on the lower end of the pad 245', and air injected from the surface of the porous material 251 is directed to the sensor 309 via a conduction hole.

FIG. 17 is an exploded perspective view of the mask 213, the pattern 211, the static pressure gas bearing 270 which is the object of flow rate adjustment, the jig 209 and the mounting frame 208.

FIG. 18A is a cross-sectional view showing the porous gas bearing 270, and FIG. 18B is a pictorial view thereof. The reference numerals 251 and 255 designate graphite porous materials, the reference numeral 252 denotes a housing to which the porous material 251 is fixed and held, the reference numeral 253 designates an air chamber, and the reference numeral 254 denotes a compressed air supply port. When compressed air is supplied from the supply port 254, the air passes through the porous material 251 via the air chamber 253 and is injected from bearing surfaces 251a and 255a and static-pressure supports a shaft 401 in the thrust direction. Here, the flow rate at which the air is injected per unit area of the bearing surfaces 251a and 255a, i.e., the flow rate of passage of gas, is adjusted by the apparatus of the present invention so as to become uniform over the entire bearing surface at a predetermined value.

The operation of this apparatus will now be described. In FIG. 17, when the mounting frame 208 is set on the bearing 270 through the bearing fixing jig 209, the unit E mounted on the shift unit D shown in FIG. 13 moves in the horizontal direction (the direction of the X axis), and lowers in the direction of the Z axis until at its end of movement, it strikes against a stopper 210 set by the air cylinder 207 so that the spacing between the bearing adjusting surface and the pattern 211 may be constant. Subsequently, the flow rate adjusting portion B mounted on the NC robot A is moved to a flow rate adjusting position by a preset program. Here, the detection pad 245 is lowered by the air cylinder 243 with anti-rotation means shown in FIG. 16, and passes through the openings in the mask 213 and the pattern 211 and comes into intimate contact with the bearing surface, thus measuring the flow rate of passage of gas. Subsequently, the detection pad 245 is moved up in the direction of the Z axis by the air cylinder 243 with anti-rotation means. Here, the best suited opening pattern is selected by a controller from the pattern 211 having a plurality of kinds of numerical apertures for providing a predetermined flow rate of passage of gas, in accordance with the measured data and a preset program.

The spray nozzle 244 mounted on the flow rate adjusting portion B is moved to the flow rate adjusting position by a preset program, and the solvent is applied to the bearing 270 through the mask 213 and the patterns 211. Thereby, a predetermined flow rate of passage of gas is obtained within the limited range of the bearing surface. When these series of operations are completed, the pattern 211 is rotated by the pulse motor 219 shown in FIG. 14 so that the opening for the passage of the detection pad 245 may coincide with the opening in the mask 213. Subsequently, the mask 213 is rotated with the pattern 211 by the stepping motor 219 on the basis of a preset program in the direction in which the one-way cam clutch 224 becomes locked, until the boundary of the range in which the predetermined flow rate of passage of gas coincides with the boundary of the opening in the mask 213.

Here, the aforedescribed measurement by the detection pad 245 and the application of the solvent by the spray nozzle 244 through the mask 213 and the pattern 211 are repeated to thereby provide a predetermined uniform flow rate of passage of gas in the entire bearing surface of the disk-like porous static pressure gas bearing as shown in FIG. 18.

In the manner described above, the flow rate adjustment in the whole bearing surface is completed.

Subsequently, the flow rate adjusting portion B mounted on the NC robot A is moved to a position in which it does not preclude the inversion of the mounting frame 208, by a preset program. The unit E is also moved up to a position in which it does not preclude the movement of the shift unit D, by the drive of the air cylinder 207. The shift unit D is moved by the drive of the rodless cylinder 205. In this state, the mounting frame 208 is inverted by 180° by the drive of the air actuator 201 shown in FIG. 12, and the change-over of the flow rate adjusting surface of the bearing is completed. Thereafter, the aforedescribed operation is repeated, whereby a predetermined uniform flow rate of passage of gas can be provided in the both thrust surfaces of the porous gas bearing.

An embodiment of the present invention will further be described with reference to FIG. 20 which is a block diagram showing the construction of the apparatus. In FIG. 20, the reference numeral 260 designates an orthogonal three-axis NC robot which positions a flow rate detection pad 245 and a spray gun 244 relative to respective adjustment points on a bearing surface 251. The reference numeral 304 denotes a motor driver for the NC robot 260, and the reference numeral 302 designates an NC controller connected to a CPU 314. The reference numeral 315 denotes a memory connected to the CPU 314. A program for flow rate adjustment and control is memorized in the memory 315, and the CPU 314 controls the flow rate adjusting operation of this apparatus on the basis of this program. The reference numeral 246 designates an O-ring, the reference numeral 243 denotes a cylinder for moving the detection pad 245 up and down, the reference numeral 308 designates a solenoid value for changing over the upward and downward movement of the cylinder, and the reference numeral 305 denotes a driver for the electromagnetic valve 308. The driver 305 is connected to the CPU 314. The reference numeral 306 denotes a solenoid valve for intermittently supplying compressed air to the spray gun 244. The reference numeral 307 designates a driver for the solenoid valve 306. The driver 307 is also connected to the CPU 314. The reference numeral 309 denotes a flow rate sensor for converting the detected flow rate into an electrical signal, and the reference numeral 310 designates a A/D converter for converting an analog signal into a digital signal. The A/D converter 310 is connected to the CPU 314. The reference numeral 202 denotes a rotary actuator which inverts a workpiece 252 by 180° by fixing an air bearing 252 by a jig 209, connecting it to a central shaft 208 and changing over a solenoid valve 317. The reference numeral 204 designates a support bed for supporting the shaft 208, and the reference numeral 316 denotes a driver for the solenoid valve 317. The driver 316 is connected to the CPU 314. The reference numeral 303 designates a solenoid valve for switching on and off the supply of air to the air bearing 252, and the reference numeral 318 denotes a driver for the solenoid valve 303. The driver 318 is connected to the CPU 314.

The reference numeral 211 designates a pattern unit having five kinds of patterns arranged on the circumference thereof, and the reference numeral 213 denotes a mask unit for limiting the adjustment range. The respective outer peripheries of these units are toothed. The reference numeral 214 designates a pinion for transmitting rotation. A one-way clutch is contained in the pinion 214 so that the pattern unit 211 and the mask unit 213 may be rotated by the forward and reverse rotations, respectively, of the pinion. The reference numeral 215 denotes a coupling for transmitting rotational force, the reference numeral 219 designates a stepping motor for effecting rotative positioning, the stepping motor 219 containing a reduction gear therein, and the reference numeral 313 denotes a driver for operating the stepping motor 219. The driver 313 is connected to the CPU 314. The reference numeral 205 designates a rodless cylinder which permits the escape of the pattern unit 211 and the mask unit 213 so that these units may not interfere when the workpiece 252 is inverted. The reference numeral 311 denotes a solenoid valve for changing over the rodless cylinder, and the reference numeral 312 designates a driver for operating the solenoid valve 311. The driver 312 is connected to the CPU 314. The reference numeral 301 denotes a compressor which is a compression source. The compressor 301 is connected to the respective solenoid valves.

The operation of the apparatus constructed as described above will now be described.

After the workpiece 252 is fixed to an inverting unit using the fixing jig 209, the solenoid valve 303 is energized and compressed air is supplied to the workpiece 252. Subsequently, the solenoid valve 311 is operated and the pattern unit 211 and the mask unit 213 are disposed at positions coaxial with the workpiece 252. Then, the robot 260 is moved to a pretaught start point by a command from the CPU 314, and the detection pad 245 is stopped at that point, whereafter the solenoid valve 308 is changed over to operate the cylinder 243, and the detection pad 245 is lowered onto the bearing surface 251 to detect the flow rate. The detected flow rate is converted into an electrical signal by the flow rate sensor 309, and is further converted into a digital signal by the A/D converter 310 and introduced into the CPU 314. From the thus introduced flow rate data, an appropriate pattern 211 is selected by a preprogrammed calculation method, the motor 219 is driven through the stepping motor driver 313 and one of the opening patterns disposed on the circumference is selected. Subsequently, the robot 260 is moved to move the spray gun 244 to the adjusting point. The solenoid valve 306 is intermittently operated, and a predetermined quantity of solvent is injected from the spray gun 244 and is blown against the bearing surface 251 through the pattern 211. Then, a command is again put out to the robot 260 to change over the positions of the spray gun 244 and the detection pad 245, whereby the flow rate after the spraying is detected. When by the above-described operation being repetitively performed, the flow rate is adjusted to a preset flow rate range, a command is put out from the CPU 314, and the mask 213 and the robot 260 are moved to the next point, and flow rate adjustment is likewise effected. When the above-described operation is repeated and all the adjustment is terminated, the solenoid valve 311 is changed over and the rodless cylinder 205 is operated, whereby the pattern unit 211 and the mask unit 213 are moved to their escape positions. Further, the solenoid valve 317 is changed over, the rotary actuator 202 is operated and the workpiece 252 is inverted. Further, the pattern unit 211 and the mask unit 213 are disposed coaxially with the workpiece 252 and flow rate adjustment is started, and at a stage whereat the adjustment of all points has been completed, the respective units restore their initial states, and all operations are completed.

According to the apparatus as described above, the flow rate adjustment in the porous static pressure gas bearing can be automatically and continuously effected, whereby a reduction in cost by a reduction in the number of process steps can be achieved and uniform quality can be obtained. Also, the change-over of the flow rate adjusting surface can be automatically effected in a large bearing and therefore, improved working efficiency and safety can be achieved.

We claim:

1. A method of manufacturing a porous static pressure gas bearing, including the steps of:
   providing a porous material impregnated with resin;
   selecting a pattern having a plurality of openings suited for providing a predetermined flow rate of gas through the gas bearing;
   placing said pattern having said plurality of openings so as to face a bearing surface of the porous material; and
   spraying a solvent for dissolving the resin through the pattern and onto the bearing surface of the porous material to dissolve the resin and provide said predetermined flow rate of gas passing through the bearing surface.

2. A method according to claim 1, wherein the openings in the pattern are substantially evenly distributed.

3. A method according to claim 2, wherein each of the openings in the pattern has substantially the same diameter.

4. A method according to claim 1, further comprising the steps of providing a source of pressurized gas and selecting, when the solvent is sprayed, a first state for supplying said pressurized gas to the porous material or a second state in which said pressurized gas is not supplied to the porous material.

5. A method of manufacturing a porous static pressure gas bearing, including the steps of:
   providing a porous material impregnated with resin;
   selecting a pattern having a plurality of openings suited for providing a predetermined flow rate of gas through the gas bearing;
   placing said pattern having said plurality of openings so as to face a bearing surface of the porous material;
   providing a source of pressurized gas;
   selecting either one of a first state for supplying said pressurized gas to the porous material and a second state in which said pressurized gas is not supplied to the porous material;
   spraying a solvent for dissolving the resin through the pattern and onto the bearing surface;
   passing gas through the bearing surface;
   measuring a flow rate of said gas passing through the bearing surface of the porous material and producing a measurement result;
   calculating when the measurement result does not fall within an allowable value corresponding to said predetermined flow rate and providing a calculation result; and selecting one of the first and second states based on the calculation and determining if the spraying step should be repeated.

6. A method according to claim 5, wherein the first state is selected when the measurement result is below a lower limit of the allowable value, and the second state is selected when the measurement result exceeds an upper limit of the allowable value.

7. A method according to claim 6, further comprising the steps of:
providing a spray gun for spraying the solvent and a measuring device for measuring the flow rate of the gas; and
moving the spray gun and measuring device relative to the bearing surface of the porous material.

8. A method according to claim 5, wherein the openings of the pattern are substantially evenly distributed.

9. A method according to claim 8, wherein each of the openings of the pattern has substantially the same diameter.

10. A method of manufacturing a porous static gas bearing, including the steps of:
providing a porous material impregnated with resin;
selecting one of a plurality of patterns, the selected pattern suited for providing a predetermined flow rate of gas through the gas bearing, and placing the selected pattern so as to face a bearing surface of the porous material, wherein each pattern contains a plurality of openings, with opening ratios of each of the patterns being different from one another;
spraying a solvent for dissolving the resin through the selected pattern and onto the bearing surface;
passing gas through the bearing surface;
measuring a flow rate of said gas passing through the bearing surface of the porous material and providing a measurement result;
calculating when the measurement result does not fall within an allowable value corresponding to said predetermined flow rate and providing a calculation result; and
determining, based on the calculation result, if the spraying step should be repeated and which of the plurality of patterns should be selected.

11. A method according to claim 10, further comprising the steps of providing a source of pressurized gas and selecting, when the solvent is sprayed, a first state for supplying said pressurized gas to the porous material or a second state in which said pressurized gas is not supplied to the porous material.

12. A method according to claim 11, wherein one of the first and second states is selected based upon the calculation result.

13. A method according to claim 10, wherein the openings of each of the plurality of patterns are substantially evenly distributed in their respective patterns.

14. A method according to claim 10, wherein each of the openings in the patterns has substantially the same diameter in their respective pattern.

15. A method according to claim 14, wherein the openings in the patterns are arranged with a different pitch from the openings of another pattern.

16. A method according to claim 10, further comprising the step of providing a mask having an open portion to define the portion of the pattern that is sprayed.

17. A method according to claim 16, wherein the mask has a plurality of open portions with different configurations from one another.

18. A method according to claim 10, wherein one of the patterns defines an entirely open space.

19. A method of manufacturing a porous static pressure gas bearing, including the steps of:
providing a porous material impregnated with resin;
selecting one of a plurality of patterns, the selected pattern suited for providing a predetermined flow rate of gas through the gas bearing, and placing the selected pattern so as to face a bearing surface of the porous material, wherein each pattern contains a plurality of openings with an opening ratio of each of the patterns being different from one another;
selecting either one of a first state for supplying a pressurized gas to the porous material and a second state in which the pressurized gas is not supplied to the porous material;
spraying a solvent for dissolving the resin through a mask and the selected pattern to a limited region in the bearing surface of the porous material;
passing gas through the bearing surface;
measuring a flow rate of said gas passing through the bearing surface of the porous material and providing a measurement result;
calculating when the measurement result does not fall within an allowable value corresponding to said predetermined flow rate and providing a calculating result; and
selecting one of the first and second states and one of the patterns based on at least one of the measurement result and the calculation result so as to determine if the spraying step should be repeated.

20. A method according to claim 19, wherein the first state is selected when the measurement result is below a lower limit of the allowable value, and the second state is selected when the measurement result exceeds an upper limit of the allowable value.

21. A method according to claim 20, wherein the calculation result is calculated by using a present measurement result and an immediately preceding measurement result, and the selection of the patterns is made by comparing the calculation result with prestored pattern selection data.

22. A method according to claim 21, wherein the calculation result is obtained by using a difference between the present measurement result and the immediately preceding measurement result.

* * * * *

UNITED STATES PATENT AND TRADEMARK OFFICE
CERTIFICATE OF CORRECTION

PATENT NO. : 5,110,520
DATED     : May 5, 1992
INVENTOR(S) : Takatomi Miyazaki, et al.

It is certified that error appears in the above-identified patent and that said Letters Patent is hereby corrected as shown below:

COLUMN 4:

Line 10, "bores" should read --pores--.

COLUMN 7:

Line 18, "similar" should read --similar to--.

COLUMN 16:

Line 39, "calculat-" should read --calculation--.
Line 40, "ing" should be deleted.

Signed and Sealed this

Thirtieth Day of November, 1993

BRUCE LEHMAN

Attest:

Attesting Officer

Commissioner of Patents and Trademarks